(12) United States Patent
Kellner et al.

(10) Patent No.: US 11,780,310 B2
(45) Date of Patent: Oct. 10, 2023

(54) MOTOR VEHICLE COMPRISING A TRACTION BATTERY MODULE

(71) Applicant: Dr. Ing. h.c. F. Porsche Aktiengesellschaft, Stuttgart (DE)

(72) Inventors: Philipp Kellner, Renningen (DE); Sascha Mostofi, Zeltingen (DE); Christopher Volkmer, Niefern-Öschelbronn (DE); Immanuel Vogel, Kornwestheim (DE); Adrian Starczewski, Korntal-Münchingen (DE); Dieter Schiebel, Korntal-Münchingen (DE); Ralf Keller, Pforzheim (DE); Maximilian Müller, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 81 days.

(21) Appl. No.: 17/522,018

(22) Filed: Nov. 9, 2021

(65) Prior Publication Data

US 2022/0144066 A1 May 12, 2022

(30) Foreign Application Priority Data

Nov. 10, 2020 (DE) ...................... 10 2020 129 564.2

(51) Int. Cl.
*B60K 1/02* (2006.01)
*B60K 1/04* (2019.01)
(Continued)

(52) U.S. Cl.
CPC ............. *B60K 1/04* (2013.01); *H01M 10/613* (2015.04); *H01M 50/183* (2021.01);
(Continued)

(58) Field of Classification Search
CPC . B60K 1/04; B60K 2001/005; H01M 10/613; H01M 50/183; H01M 50/209;
(Continued)

(56) References Cited

U.S. PATENT DOCUMENTS 6,074,779 A * 6/2000 Austin .................. H01M 50/20
429/97
9,685,645 B2 * 6/2017 Janarthanam ....... H01M 50/317
(Continued)

FOREIGN PATENT DOCUMENTS

DE 102012219301 A1 2/2014
DE 102018221990 A1 6/2020
(Continued)

OTHER PUBLICATIONS

Great Britain Combined Search and Examination Report for Application No. GB2116135.1, dated May 3, 2022, 3 pages.

*Primary Examiner* — James A English
*Assistant Examiner* — James J Triggs
(74) *Attorney, Agent, or Firm* — RatnerPrestia

(57) ABSTRACT

A motor vehicle includes a traction battery module which has a hermetically sealed module housing in which at least one cell stack pair including a left-hand-side and a right-hand-side cell stack including, in each case, at least two battery cells is accommodated. The traction battery module is arranged in the vehicle floor and extends symmetrically in relation to the vehicle center (M) in the vehicle transverse direction (X). The traction battery module has a bottom wall in a horizontal plane. A gas space is formed in the module housing in the vehicle center (M) and between the left-hand-side cell stack and the right-hand-side cell stack with respect to the vehicle transverse direction (X). The module bottom wall has a degassing element centrally in the vehicle in the region of the gas space.

13 Claims, 3 Drawing Sheets

(51) Int. Cl.
*H01M 50/209* (2021.01)
*H01M 50/30* (2021.01)
*H01M 10/613* (2014.01)
*H01M 50/471* (2021.01)
*H01M 50/183* (2021.01)

(52) U.S. Cl.
CPC ......... *H01M 50/209* (2021.01); *H01M 50/30* (2021.01); *H01M 50/471* (2021.01); *B60K 2001/0438* (2013.01); *H01M 2220/20* (2013.01)

(58) Field of Classification Search
CPC ............. H01M 50/30; H01M 2220/20; H01M 10/6556; H01M 50/204
See application file for complete search history.

(56) References Cited

U.S. PATENT DOCUMENTS

| | | | |
|---|---|---|---|
| 10,476,047 B2 * | 11/2019 | Feigl | H01M 50/169 |
| 2009/0136843 A1 * | 5/2009 | Yamamoto | H01M 50/197 429/185 |
| 2018/0351219 A1 | 12/2018 | Smith et al. | |
| 2020/0161721 A1 | 5/2020 | Wang | |

FOREIGN PATENT DOCUMENTS

| | | |
|---|---|---|
| JP | 2014102934 A | 6/2014 |
| WO | 2020134070 A1 | 7/2020 |

\* cited by examiner

MOTOR VEHICLE COMPRISING A TRACTION BATTERY MODULE

CROSS-REFERENCE TO RELATED APPLICATION

This application claims priority to German Patent Application No. 10 2020 129 564.2, filed Nov. 10, 2020, the content of such application being incorporated by reference herein in its entirety.

FIELD OF THE INVENTION

The invention relates to a motor vehicle comprising a traction battery module which feeds electrical energy to an electric traction motor of the motor vehicle.

BACKGROUND OF THE INVENTION

Motor vehicle traction battery modules have a hermetically sealed module housing in which a plurality of cell stacks in each case consisting of a plurality of battery cells are generally accommodated in a gas-tight manner. In the case of a thermal event, gases having very high temperatures may suddenly emerge from the cell stack and these have to be routed out of the module housing in a targeted manner. DE 10 2018 221 990 A1, which is incorporated by reference herein, discloses a traction battery having a large number of battery cells within a battery housing which has a lateral degassing element in the form of a rupture zone which breaks open given a correspondingly high internal gas pressure and allows the gas to escape in this region. The battery cells are at various distances from the degassing element, and therefore the high-temperature gas flow of one battery cell may massively heat up several other battery cells on its way to the degassing element.

In view of the foregoing, it would be desirable to create a motor vehicle traction battery with improved dissipation of hot gas.

SUMMARY OF THE INVENTION

The motor vehicle according to aspects of the invention has a traction battery module which has a hermetically sealed module housing in which at least one cell stack pair is arranged. The module housing is sealed off in a substantially gas-tight manner. A cell stack pair consists, in each case with respect to the vehicle longitudinal axis, of a left-hand-side cell stack and of a right-hand-side cell stack. Each cell stack consists in each case of at least two battery cells. The traction battery module is arranged in the vehicle floor and extends symmetrically in relation to the vehicle center in the vehicle transverse direction. The module housing has a bottom wall that lies in a horizontal plane. A free gas space, which is not filled with any filler material, in particular is not filled with a thermally conductive compound, is formed between the left-hand-side cell stack and the right-hand-side cell stack inside the module housing and approximately in the vehicle center. The module bottom wall has a degassing element in the region of the gas space and approximately centrally in the vehicle, it being possible for the high-temperature gas arriving from one of the battery cells to escape through said degassing element in the vehicle center downward out of the vehicle floor to the outside of the vehicle. Therefore, the traction battery module is designed in such a way that every cell stack is directly fluidically connected to the gas element, so that the high-temperature gas emerging from each cell stack can flow out of each of said cell stacks, across the gas space, directly to the degassing element, without having to flow past another cell stack to an appreciable extent in so doing. This reliably prevents a chain reaction inside the traction battery module. Since degassing takes place via the degassing element directly centrally in the vehicle to the vehicle bottom side, a short flow path from each cell stack to the degassing element is realized and locally limited heating of the traction battery module is ensured. Furthermore, good occupant protection is ensured owing to the high-temperature gas passing directly to the vehicle bottom side in the center.

The gas space is preferably substantially cuboidal and has a width of at least 10 cm in the vehicle transverse direction. The gas space preferably has a width of at most 30 cm in the vehicle transverse direction. The gas space preferably extends vertically over the entire vertical extent of the adjacent cell stack or extends over the entire longitudinal extent of the adjacent cell stack in the longitudinal direction. Therefore, each cell stack, by way of one cell stack side, adjoins the gas space approximately over the entire surface area. This ensures that the flow resistance between each cell stack and the gas space is approximately zero in each case and an overpressure, by way of which the degassing element is opened, can build up in the gas space as quickly as possible.

The degassing element is preferably designed as a gas-tight rupture disk. The rupture disk is configured in such a way that it reliably breaks open given an appreciable overpressure, so that the degassing element reliably opens in this way in the event of a thermal disturbance. The rupture disk may be realized, for example, simply as a weakened portion in the material of the bottom wall of the module housing, but may also be designed as a mechanical overpressure valve which closes again after the internal overpressure has decreased.

The motor vehicle preferably has a planar and liquid-cooled cooling base, by way of which the bottom side of the traction battery module is actively cooled, below the module bottom wall. The cooling base has a degassing opening, disposed centrally in the vehicle, in vertical alignment with the degassing element with respect to the vehicle transverse direction. Therefore, the degassing opening is vertically aligned with the degassing element. In this way, degassing of the traction battery module through the cooling base in the event of a disturbance is not hampered.

Two cell stack pairs may preferably be provided inside the module housing, said cell stack pairs being arranged adjacent to one another as seen in the vehicle longitudinal direction. In principle, a single degassing element may be associated centrally with the two gas spaces. However, it is particularly preferably provided that the two cell stack pairs and the two gas spaces respectively associated with them are insulated from one another in a gas-tight manner, wherein a dedicated degassing element is respectively associated with each gas space.

Four side walls of the module housing are preferably formed in one piece from an extrusion profile.

BRIEF DESCRIPTION OF THE DRAWINGS

An exemplary embodiment of the invention will be explained in more detail below with reference to the drawings, in which.

DETAILED DESCRIPTION OF THE INVENTION

Figure 1:
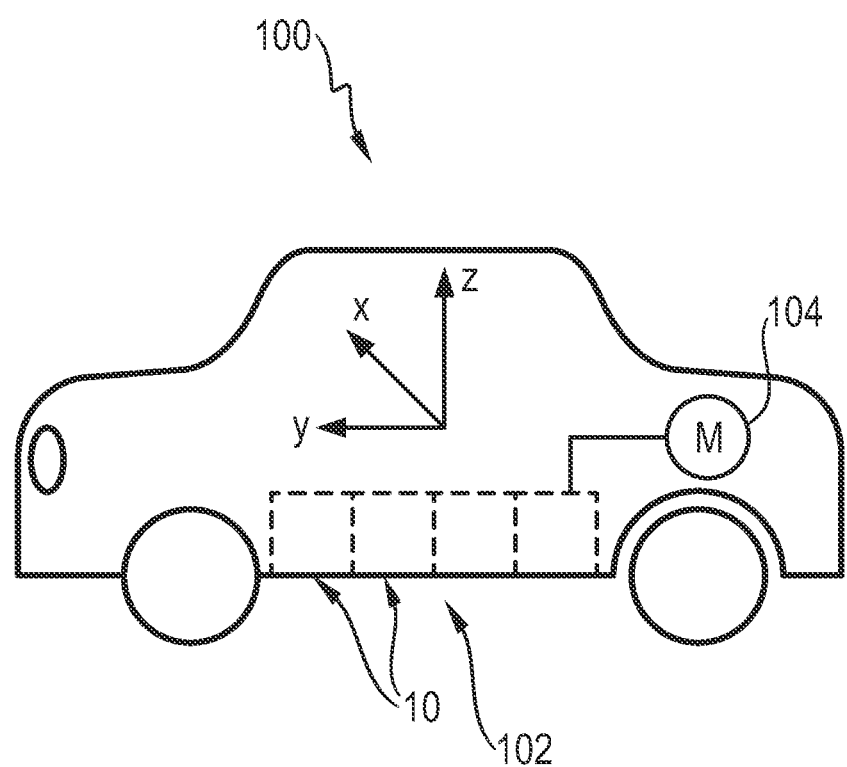
FIG. 1 schematically shows a motor vehicle comprising a traction battery module in the vehicle floor.
Figure 2:
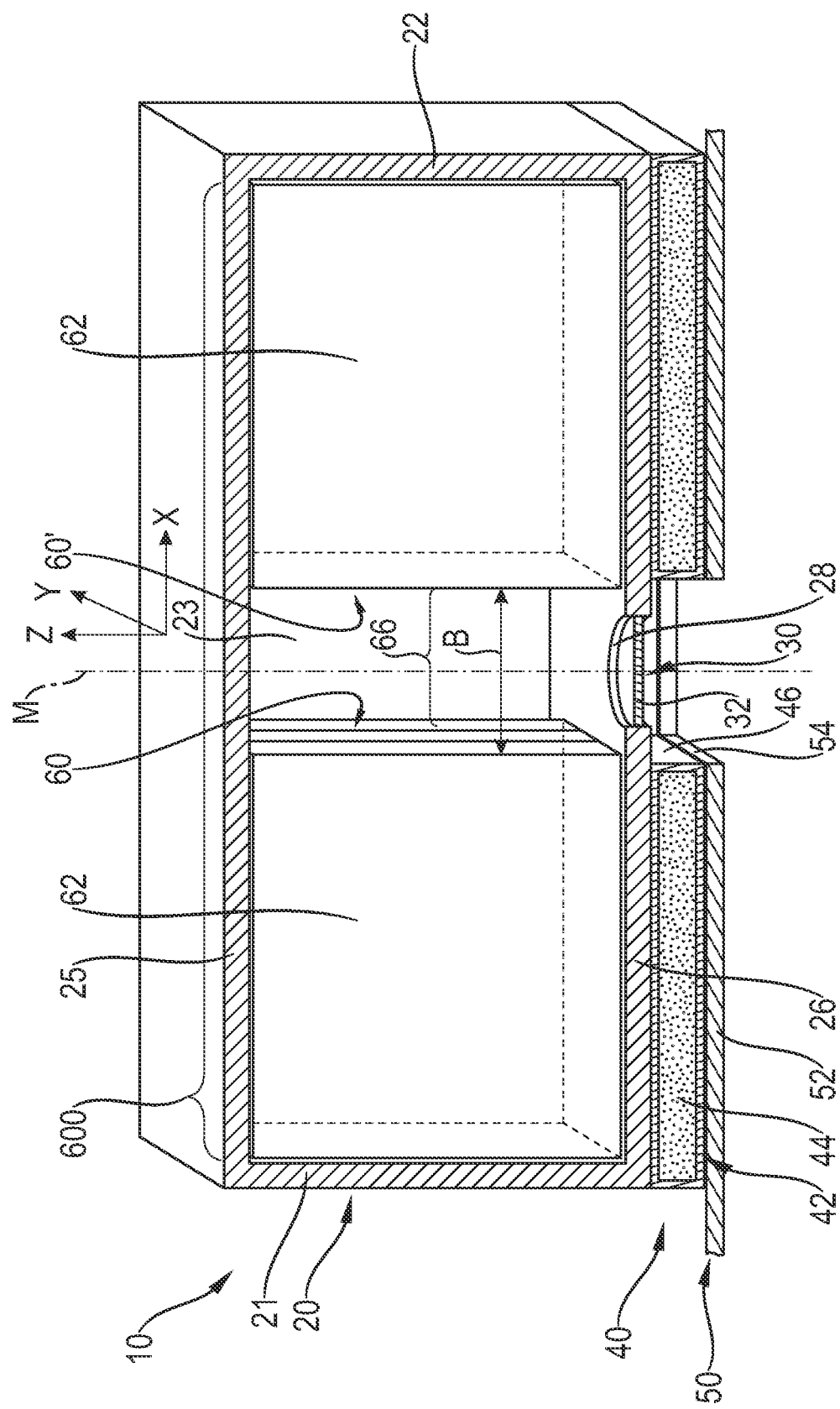
FIG. 2 shows a cross section through the traction battery module of FIG. 1.

FIG. 1 schematically shows a motor vehicle 100 comprising an electric traction motor 104 which, in the vehicle floor 102, has a plurality of traction battery modules 10 which together form the traction battery of the motor vehicle 100. The direction of travel of the motor vehicle 100 is the vehicle longitudinal direction Y, the transverse direction is the vehicle transverse direction X and the vertical of said motor vehicle is the vehicle vertical axis Z.

Each traction battery module 10 has two cell stack pairs 600, 600' in each case consisting of a left-hand-side cell stack 60 and a right-hand-side cell stack 60', wherein the left-hand-side cell stack 60 is located in the left-hand-side vehicle half to the left of the vehicle center M and the right-hand-side cell stack 60' is located in the right-hand-side vehicle half to the right of the vehicle center M. The traction battery module 10 extends substantially over most of the width of the vehicle floor 102. Each cell stack 60, 60' in each case consists of a plurality of battery cells 62 which, in the present case, are in a vertical transverse plane, so that a proximal narrow side of each battery cell 62 adjoins a cuboidal gas space 66 that is disposed centrally in the module and constitutes a clearance which is not filled with a solid substance. The gas space 66 extends over the entire longitudinal extent in the longitudinal direction and over the entire vertical extent of the adjoining two cell stacks 60, 60' in the vertical direction. The cuboidal gas space 66 has a width B of, for example, 20 cm in the vehicle transverse direction X.

The cuboidal metal module housing 20 that provides sealing in gas-tight manner has a left-hand-side side wall 21, a right-hand-side side wall 22, a top wall 25, a bottom wall 26, a front end wall 23 and a rear end wall 24. The module housing 20 is partially formed by an extrusion profile body which forms the four long housing walls 21, 22, 25, 26 and a separating wall 80, while the left-hand-side side wall 21 and right-hand-side side wall 22 of relatively small surface area were mounted on the extrusion profile body in a gas-tight manner, for example by welding, after insertion of the two cell stack pairs 600, 600' into the profile body.

With respect to the transverse direction x, a degassing element 30, which is gas-tight in principle but is configured in such a way that it is permanently destroyed when a defined differential pressure between the gas space 66, 66' and the outside atmospheric pressure is exceeded, is in each case arranged in the region of the vehicle center M and approximately in the center of the respective gas space 66, 66' in the bottom wall 26. The degassing element 30 is formed in each case by a rupture disk 32 which is seated in a degassing opening 28 of the bottom wall 26 in a gas-tight manner.

A liquid-cooled cooling base 40, which is actively cooled approximately over the entire surface area by a cooling liquid 44 flowing through a cooling duct 42, is arranged adjoining the bottom of the bottom wall 26 of the module housing 20. The cooling base 40 is thermally coupled over the entire surface area to the module housing bottom wall 26, so that most of the heat generated by the traction battery module 10 is dissipated via the cooling base 40 in the charging mode or in the traction mode. The cooling base 40 has a corresponding degassing opening 46, through which the gas can escape from the gas space 66 perpendicularly downward to the vehicle center in the case of degassing, in vertical alignment with the degassing element 30.

Figure 3:
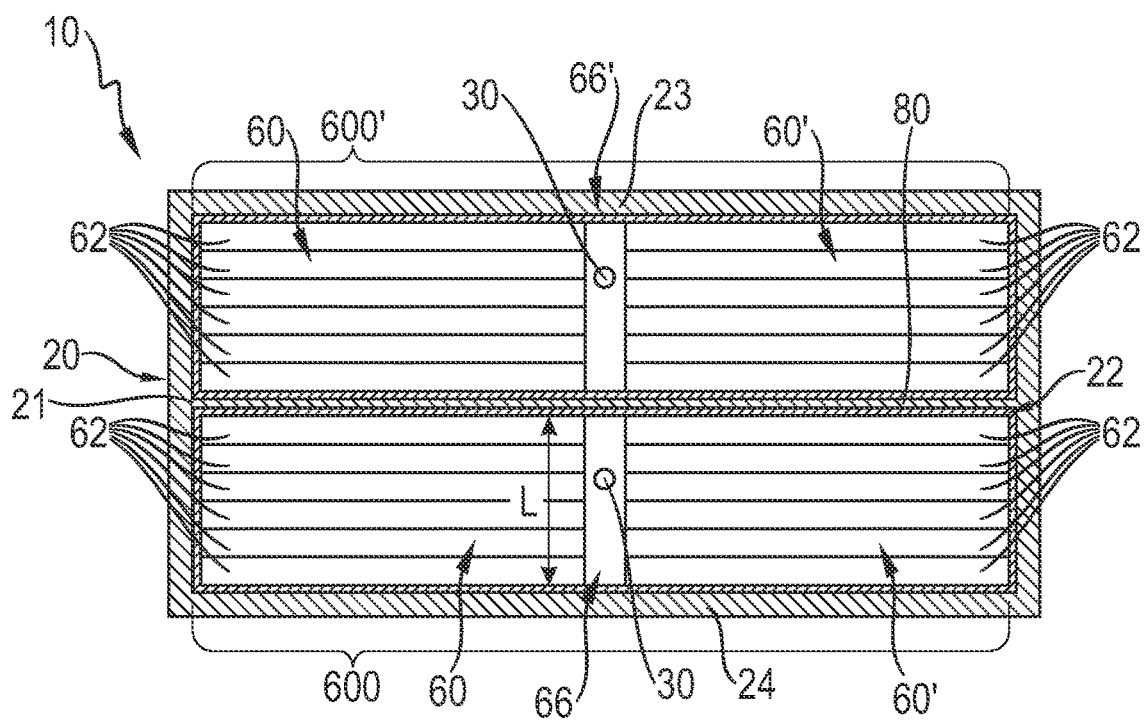
FIG. 3 shows a horizontal section through the traction battery module of FIGS. 1 and 2.
Figure 4:
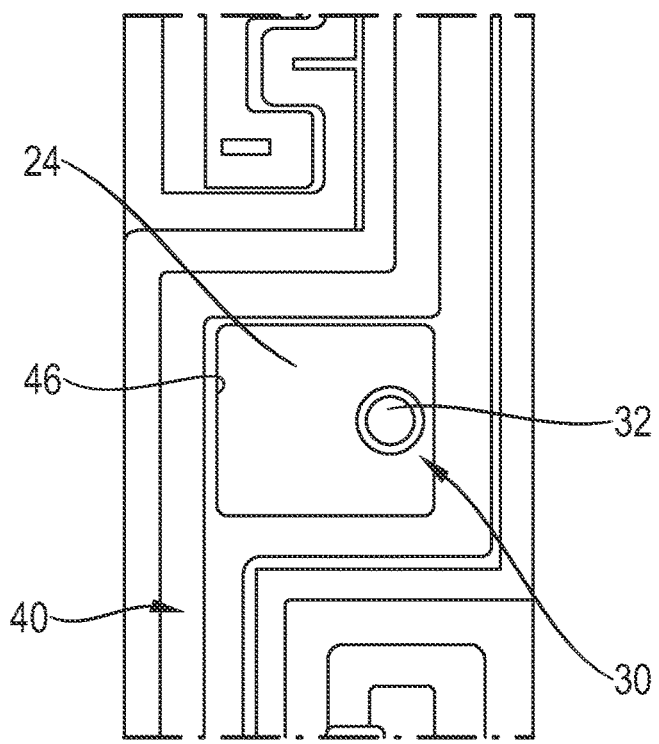
FIG. 4 shows a bottom vehicle-floor view of a cooling base below the traction battery module of FIGS. 1-3.

It can be seen in the horizontal section of FIG. 3 that the outer module housing 20 contains two cell stack pairs 60, 60' which are separated from one another in a gas-tight manner by the separating wall 80 that is in a vertical transverse plane, so that a dedicated gas space 66, 66' and a dedicated degassing element 30, 30 are associated with each cell stack pair 600, 600'.

What is claimed is:

1. A motor vehicle comprising a traction battery module, the traction battery module comprising:
    a hermetically sealed module housing,
    at least two cell stack pairs including a left-hand-side cell stack and a right-hand-side cell stack accommodated in the module housing, wherein each cell stack includes at least two battery cells,
    wherein the traction battery module is arranged in a vehicle floor, extends symmetrically with respect to a vehicle center (M) in a vehicle transverse direction (X) and has a bottom wall in a horizontal plane, wherein the at least two cell stack pairs are arranged adjacent to one another as seen in a vehicle longitudinal direction (Y),
    wherein two gas spaces are formed in the module housing in the vehicle center (M) between the at least two cell stack pairs with respect to the vehicle transverse direction (X), and
    wherein the two gas spaces are insulated from one another in a gas-tight manner and two dedicated degassing elements are respectively associated with each of the two gas spaces.

2. The motor vehicle as claimed in claim 1, wherein four side walls of the module housing are formed in one piece from an extrusion profile.

3. The motor vehicle as claimed in claim 1, wherein each of the two dedicated degassing elements are arranged in a center of one of the two gas spaces relative to the vehicle transverse direction (X).

4. The motor vehicle as claimed in claim 1, wherein each of the two dedicated degassing elements is arranged between the left-hand-side cell stack and a right-hand-side cell stack.

5. The motor vehicle as claimed in claim 1, further comprising a separating wall arranged between the at least two cell stack pairs.

6. The motor vehicle as claimed in claim 5, wherein each of the two dedicated degassing elements is arranged on an opposite side relative to the separating wall.

7. The motor vehicle as claimed in claim 1, wherein the at least two battery cells are stacked in a vertical transverse plane, so that a proximal narrow side of each of the at least two battery cells adjoins the two dedicated gas spaces.

8. The motor vehicle as claimed in claim 1, wherein the two gas spaces are cuboidal and have a width (B) of at least 10 cm in the vehicle transverse direction (X).

9. The motor vehicle as claimed in claim 1, wherein the two gas spaces are cuboidal and have a width (B) of at most 30 cm in the vehicle transverse direction (X).

10. The motor vehicle as claimed in claim 1, wherein the two gas spaces are cuboidal and extend over the entire vertical extent of the left-hand-side cell stack and the right-hand-side cell stack in a vertical direction (Z).

11. The motor vehicle as claimed in claim 1, wherein the two gas spaces are cuboidal and extend over an entire longitudinal extent (L) of one of the left-hand-side cell stack or the right-hand-side cell stack in a vehicle longitudinal direction (Y).

12. The motor vehicle as claimed in claim 1, wherein at least one degassing element of the two dedicated degassing elements is a gas-tight rupture disk.

13. The motor vehicle as claimed in claim 1, further comprising a planar and liquid-cooled cooling base which (i) has a degassing opening, (ii) is disposed centrally in the motor vehicle, in vertical alignment with the degassing element, and (iii) is arranged below the module bottom wall.

\* \* \* \* \*